(12) United States Patent
Sasaki

(10) Patent No.: US 6,992,708 B1
(45) Date of Patent: Jan. 31, 2006

(54) SIGNAL PROCESSING CIRCUIT OF IMAGE INPUT APPARATUS

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 0 days.

(21) Appl. No.: 09/504,082

(22) Filed: Feb. 15, 2000

(30) Foreign Application Priority Data

Feb. 15, 1999 (JP) ............................. P11-035703

(51) Int. Cl.
*H04N 5/228* (2006.01)

(52) U.S. Cl. ................................. 348/222.1; 382/296
(58) Field of Classification Search .............. 382/296, 382/297, 295; 348/580, 583
See application file for complete search history.

(56) References Cited

U.S. PATENT DOCUMENTS 4,689,824 A * 8/1987 Mitchell et al. ............ 382/297
5,189,404 A * 2/1993 Masimo et al. ............. 345/659
6,011,585 A * 1/2000 Anderson ................... 348/272

OTHER PUBLICATIONS

U.S. Appl. No. 09/459,574, filed Dec. 13, 1999, pending.
U.S. Appl. No. 09/964,458, filed Sep. 28, 2001, pending.
U.S. Appl. No. 09/985,373, filed Nov. 2, 2001, pending.
U.S. Appl. No. 09/504,082, filed Feb. 15, 2000, Sasaki.
U.S. Appl. No. 10/694,914, filed Oct. 29, 2003, Sasaki.
U.S. Appl. No. 10/694,913, filed Oct. 29, 2003, Sasaki.
U.S. Appl. No. 10/694,909, filed Oct. 29, 2003, Sasaki.

* cited by examiner

*Primary Examiner*—David L. Ometz
*Assistant Examiner*—Yogesh K. Aggarwal
(74) *Attorney, Agent, or Firm*—Oblon, Spivak, McClelland, Maier & Neustadt, P.C.

(57) ABSTRACT

A signal processing circuit is provided which can perform high-speed image rotation, reflection, and the like, by such a configuration that an image input apparatus, e.g., a digital still camera, has a coprocessor connected to a CPU; the coprocessor has register groups (RG1 to RG4) which are electrically connected one another, each register group having registers (R1 to R4) of 32 bits length; and the registers (R1 to R4) store a one-byte image data in the zero-th to third bytes, respectively. When an image data read from the CPU to the register group (RG3) is transferred to the register group (RG1) through the register group (RG2), the image can be rotated 90 degrees counterclockwise. Also, other processing such as a clockwise 90 degrees rotation, symmetrical reflection in horizontal direction, etc. can be conducted at a high speed, without converting the data length of an image data.

3 Claims, 14 Drawing Sheets

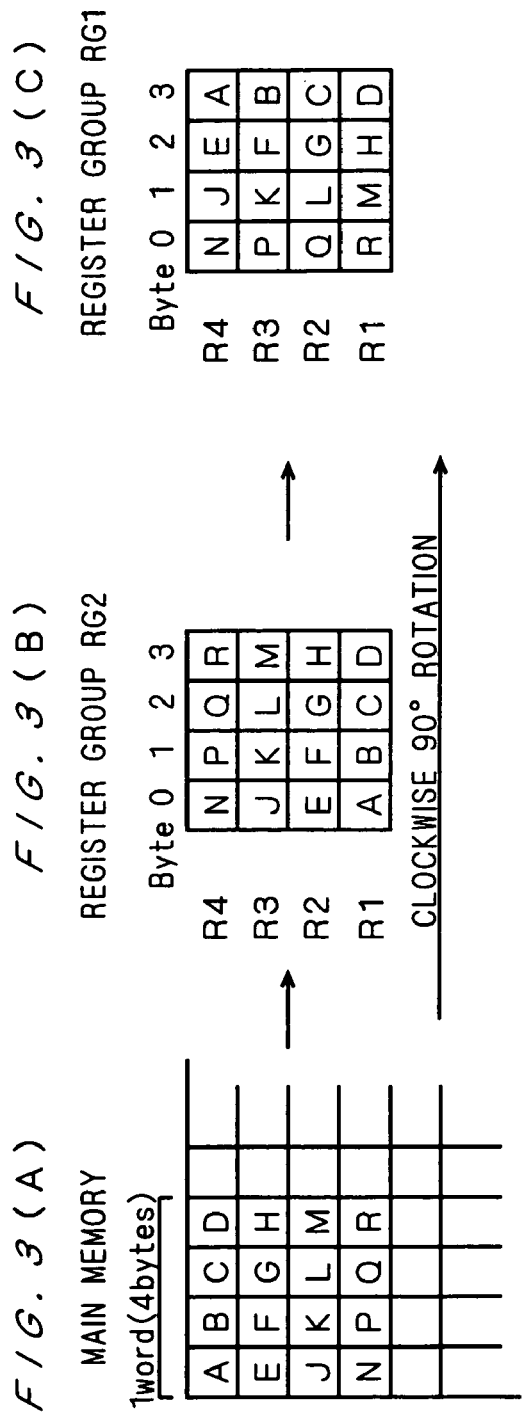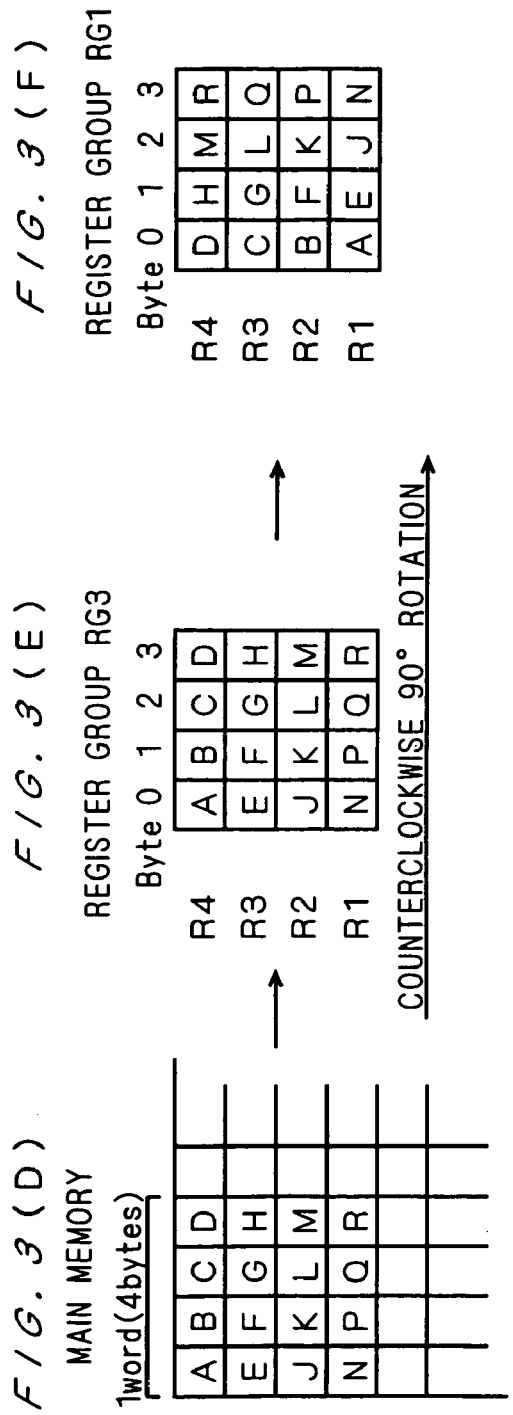

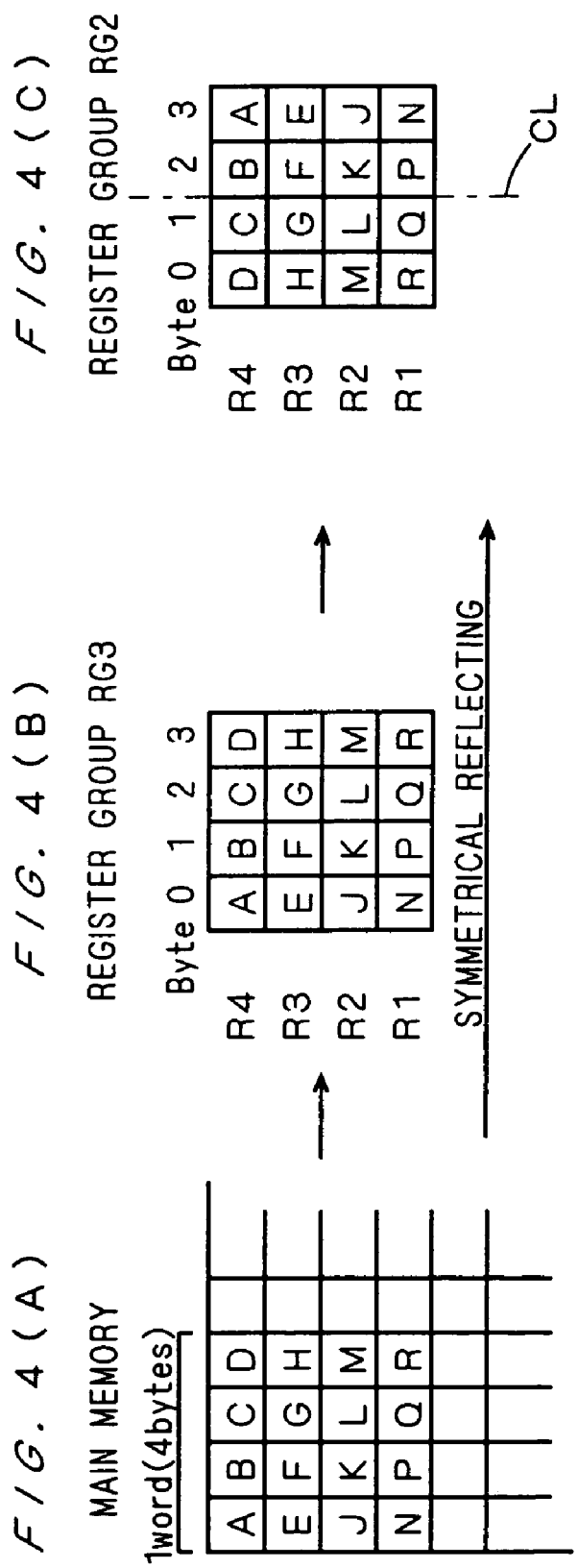

FIG. 7

REGISTER GROUP RG5

| Byte | 0 | 1 | 2 | 3 | |
|---|---|---|---|---|---|
| | Y2 | Cb0 | Y0 | Cr1 | R4 |
| | Y3 | Cb0 | Y1 | Cr1 | R3 |
| | Y6 | Cb4 | Y4 | Cr5 | R2 |
| | Y7 | Cb4 | Y5 | Cr5 | R1 |

↑ CLOCKWISE 90° ROTATION

REGISTER GROUP RG4

| Byte | 0 | 1 | 2 | 3 | |
|---|---|---|---|---|---|
| | Y0 | Cb0 | Y1 | Cr1 | R4 |
| | Y2 | Cb2 | Y3 | Cr3 | R3 |
| | Y4 | Cb4 | Y5 | Cr5 | R2 |
| | Y6 | Cb6 | Y7 | Cr7 | R1 |

FIG. 9

REGISTER GROUP RG6

| Byte | 0 | 1 | 2 | 3 | |
|---|---|---|---|---|---|
| | Y0 | Cb0 | Y1 | Cr1 | R4 |
| | Y2 | Cb2 | Y3 | Cr3 | R3 |
| | Y4 | Cb4 | Y5 | Cr5 | R2 |
| | Y6 | Cb6 | Y7 | Cr7 | R1 |

COUNTERCLOCKWISE 90° ROTATION ↑

REGISTER GROUP RG7

| Byte | 0 | 1 | 2 | 3 | |
|---|---|---|---|---|---|
| | Y1 | Cb0 | Y3 | Cr1 | R4 |
| | Y0 | Cb0 | Y2 | Cr1 | R3 |
| | Y5 | Cb4 | Y7 | Cr5 | R2 |
| | Y4 | Cb4 | Y6 | Cr5 | R1 |

FIG. 13

| | Byte 0 | 1 | 2 | 3 | REGISTER GROUP RG9 |
|---|---|---|---|---|---|
| R4 | Y0 | Cb0 | Y1 | Cr1 | |
| R3 | Y2 | Cb2 | Y3 | Cr3 | |
| R2 | Y4 | Cb4 | Y5 | Cr5 | |
| R1 | Y6 | Cb6 | Y7 | Cr7 | |

↑ COUNTERCLOCKWISE ROTATION INSTRUCTION

| | Byte 0 | 1 | 2 | 3 | REGISTER GROUP RG9 |
|---|---|---|---|---|---|
| R4 | Y1 | Cb0 | Y3 | Cr1 | |
| R3 | Y0 | Cb0 | Y2 | Cr1 | |
| R2 | Y5 | Cb4 | Y7 | Cr5 | |
| R1 | Y4 | Cb4 | Y6 | Cr5 | |

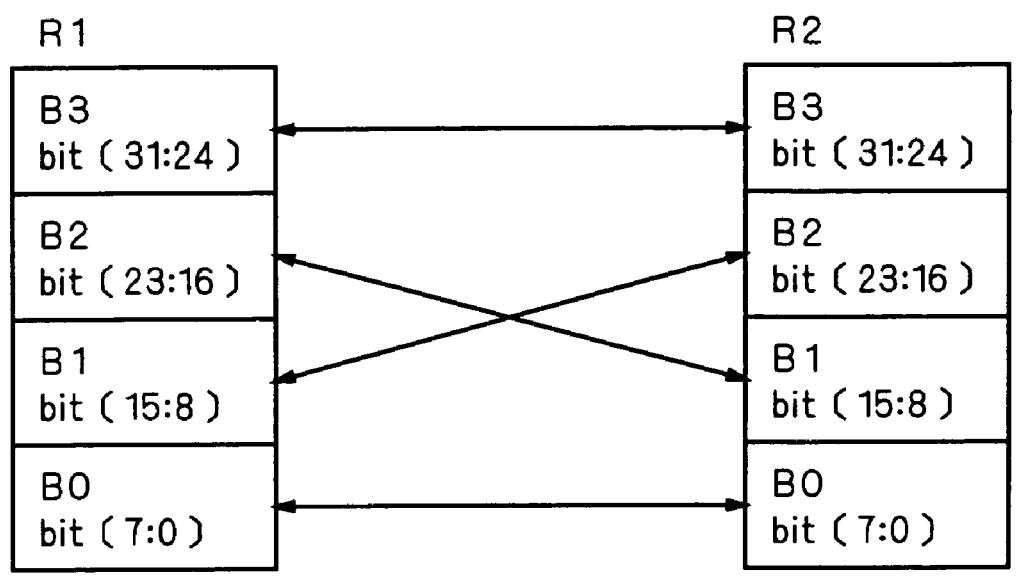
F I G. 14

SIGNAL PROCESSING CIRCUIT OF IMAGE INPUT APPARATUS

BACKGROUND OF THE INVENTION

1. Field of the Invention

The present invention relates to a signal processing circuit of an image input apparatus that converts signals in predetermined units arranged in two dimensions, which are obtained usually by an image pickup device in the image input apparatus, such as digital still cameras.

2. Description of the Background Art

Conventionally, image photographed by a digital camera has been subjected to image processing such as rotation, reflection, and conversion of arrangement of color components. At that time, the photographed image data is read in a CPU contained in the digital camera, and the mentioned image processing is conducted in the CPU by software.

Consider now a CPU that has a 32-bit register and thus expresses one pixel of an image data in units of one byte (8 bits) or the like. When this image data is subjected to the mentioned image processing by software, the processing unit of the CPU (32 bits) does not match the unit of pixels (8 bits). Therefore, after the image data is decomposed on a plurality of registers within the CPU, and then rotated, for example, a 32-bit data (hereinafter referred to as "word data") is reconfigured on the registers. That is, 24 dummy bits are added to an 8-bit image data, to obtain a 32-bit image data. This image data is stored in memory or a storage medium, and then read in the CPU in order to conduct processing. After the processing is completed, the image data is returned to a 8-bit data for preservation. As a result, this processing requires many data conversion processing between a word data and a one-byte data, thereby increasing processing time.

SUMMARY OF THE INVENTION

According to a first aspect of the invention, a signal processing circuit in an image input apparatus which stores, in storage units of a main memory, a unit image signal in predetermined units that is obtained by an image pickup device and arranged in two dimensions, the signal processing circuit reading and processing the unit image signal stored in the main memory, and the signal processing circuit comprises first and second storage means provided with a plurality of storage regions of the same number of bits as the unit image signal, wherein: the storage regions of the first storage means and the storage regions of the second storage means are connected one another, such that an array of the unit image signal stored in the main memory is stored in the storage regions of the second storage means in a state of being rotated 90 degrees clockwise, alternatively, 90 degrees counterclockwise, through proceeding that the unit image signal stored in the main memory is transferred and stored in the storage regions of the first storage means, and then the unit image signal stored in the storage regions of the first storage means is transferred and stored in the storage regions of the second storage means.

According to a second aspect, a signal processing circuit of an image input apparatus comprises first and second storage means provided with a plurality of storage regions of the same number of bits as a unit image signal in predetermined units that is obtained by an image pickup device in the image input apparatus and arranged in two dimensions, wherein the storage regions of the first storage means and the storage regions of the second storage means are directly connected one another by a predetermined connecting line, such that an array of the unit image signal stored in the storage regions of the first storage means is reflected about a centerline of the array, to be stored in the storage regions of the second storage means.

According to a third aspect, a signal processing circuit of an image input apparatus comprises first and second register groups provided with a plurality of storage regions of the same number of bits as a unit image signal in predetermined units that is obtained by an image pickup device in the image input apparatus and arranged in two dimensions, the first and second register groups having first to fourth registers, respectively, the first to fourth registers having zero-th to third storage regions, respectively, wherein: the zero-th storage regions of the first to fourth registers of the first register group are connected directly, by a predetermined connecting line, to the zero-th to third storage regions of the fourth register of the second register group; the first storage regions of the first to fourth registers of the first register group are connected directly, by a predetermined connecting line, to the zero-th to third storage regions of the third register of the second register group; the second storage regions of the first to fourth registers of the first register group are connected directly, by a predetermined connecting line, to the zero-th to third storage regions of the second register of the second register group; and the third storage regions of the first to fourth registers of the first register group are connected directly, by a predetermined connecting line, to the zero-th to third storage regions of the first register of the second register group.

According to a fourth aspect, the signal processing circuit of an image input apparatus of the third aspect further comprises a third register group having the first to fourth registers which are respectively provided with the zero-th to third storage regions of the same number of bits as a unit image signal in predetermined units arranged in two dimensions, wherein: the zero-th to third storage regions of the first register of the second register group are connected directly, by a predetermined connecting line, to the third to zero-th storage regions of the first register of the third register group, respectively; the zero-th to third storage regions of the second register of the second register group are connected directly, by a predetermined connecting line, to the third to zero-th storage regions of the second register of the third register group, respectively; the zero-th to third storage regions of the third register of the second register group are connected directly, by a predetermined connecting line, to the third to zero-th storage regions of the third register of the third register group, respectively; and the zero-th to third storage regions of the fourth register of the second register group are connected directly, by a predetermined connecting line, to the third to zero-th storage regions of the fourth register of the third register group, respectively.

According to a fifth aspect, a signal processing circuit of an image input apparatus comprises second and third register groups provided with a plurality of storage regions of the same number of bits as a unit image signal in predetermined units that is obtained by an image pickup device in the image input apparatus and arranged in two dimensions, the second and third register groups having first to fourth registers, the first to fourth registers having zero-th to third storage regions, wherein: the zero-th to third storage regions of the first register of the second register group are connected directly, by a predetermined connecting line, to the third to zero-th storage regions of the first register of the third register group, respectively; the zero-th to third storage regions of the second register of the second register group are connected directly, by a predetermined connecting line, to the third to zero-th storage regions of the second register of the third register group, respectively; the zero-th to third storage regions of the third register of the second register group are connected directly, by a predetermined connecting line, to the third to zero-th storage regions of the third register of the third register group, respectively; and the zero-th to third storage regions of the fourth register of the second register group are connected directly, by a predetermined connecting line, to the third to zero-th storage regions of the fourth register of the third register group, respectively.

According to a sixth aspect, a signal processing circuit of an image input apparatus comprises first and second storage means provided with a plurality of storage regions of the same number of bits as a unit image signal in predetermined units that is obtained by an image pickup device in the image input apparatus and arranged in two dimensions, wherein: the unit image signal is one of a plurality of components forming a predetermined unit of arrangement of color components; and the storage regions of the first storage means and the storage regions of the second storage means are directly connected one another by a predetermined connecting line, such that an array of the unit image signal stored in the storage regions of the first storage means is stored in the storage regions of the second storage means, along with a rotation conversion in which an array of the unit image signal stored in the storage regions of the first storage means is rotated 90 degrees clockwise, alternatively, 90 degrees counterclockwise, while maintaining the unit of arrangement of color components.

According to a seventh aspect, the signal processing circuit of an image input apparatus of the sixth aspect has the feature that: the rotation conversion is to perform only a clockwise 90 degrees rotation; the unit of arrangement of color components is composed of one brightness component and two color components of which frequency in the horizontal or vertical allocation is one-half the frequency in the horizontal or vertical allocation of the brightness component, a first register group is provided as the first storage means; and a second register group is provided as the second storage means, each of the first and second register groups having first and second registers, each of the first and second registers having zero-th to third storage regions storing the brightness component and the two color components, and wherein: zero-th storage region of the first register of the first register group is connected directly, by a predetermined connecting line, to the zero-th storage region of the second register of the second register group; the second storage region of the first register of the first register group is connected directly, by a predetermined connecting line, to the zero-th storage region of the first register of the second register group; the zero-th storage region of the second register of the first register group is connected directly, by a predetermined connecting line, to the second storage region of the second register of the second register group; the first storage region of the second register of the first register group is connected directly, by a predetermined connecting line, to the first storage region of the first register of the second register group and to the first storage region of the second register of the second register group; the second storage region of the second register of the first register group is connected directly, by a predetermined connecting line, to the second storage region of the first register of the second register group; and the third storage region of the second register of the first register group is connected directly, by a predetermined connecting line, to the third storage region of the first register of the second register group and to the third storage region of the second register of the second register group.

According to an eighth aspect, the signal processing circuit of an image input apparatus of the sixth aspect has the feature that: the rotation conversion is to perform only a counterclockwise 90 degrees rotation; the unit of arrangement of color components is composed of one brightness component and two color components of which frequency in the horizontal or vertical allocation is one-half the frequency in the horizontal or vertical allocation of the brightness component; and first register group is provided as the first storage means, and second register group is provided as the second storage means, each of the first and second register groups having first and second registers, each of the first and second registers having zero-th to third storage regions storing the brightness component and the two color component, and wherein: the zero-th storage region of the first register of the first register group is connected directly, by a predetermined connecting line, to the second storage region of the first register of the second register group; the second storage region of the first register of the first register group is connected directly, by a predetermined connecting line, to the second storage region of the second register of the second register group; the zero-th storage region of the second register of the first register group is connected directly, by a predetermined connecting line, to the zero-th storage region of the first register of the second register group; the first storage region of the second register of the first register group is connected directly, by a predetermined connecting line, to the first storage region of the first register of the second register group and to the first storage region of the second register of the second register group; the second storage region of the second register of the first register group is connected directly, by a predetermined connecting line, to the zero-th storage region of the second register of the second register group; and the third storage region of the second register of the first register group is connected directly, by a predetermined connecting line, to the third storage region of the first register of the second register group and to the third storage region of the second register of the second register group.

According to a ninth aspect, a signal processing circuit of an image input apparatus comprises storage means provided with a plurality of storage regions of the same number of bits as a unit image signal in predetermined units that is obtained by an image pickup device in the image input apparatus and arranged in two dimensions, the unit image signal being one of a plurality of components forming a predetermined unit of arrangement of color components, and clockwise rotation means with which, in response to input of a predetermined clockwise rotation instruction signal, an array of a unit image signal that is stored in the storage regions of the storage means is rotated 90 degrees clockwise, while maintaining the unit of arrangement of color components, and then stored in the storage regions of the storage means.

According to a tenth aspect, the signal processing circuit of an image input apparatus of the ninth aspect has the feature that: the unit of arrangement of color components is composed of one brightness component and two color components of which frequency in the horizontal or vertical allocation is one-half the frequency in the horizontal or vertical allocation of the brightness component; and a register group is provided as the storage means, the register group having first and second registers, each of the first and second registers having zero-th to third storage regions storing the brightness component and the two color components; and wherein: in response to input of the clockwise rotation instruction signal, with the clockwise rotation means, a unit image signal in the zero-th storage region of the first register is stored in the zero-th storage region of the second register; a unit image signal in the second storage region of the first register is stored in the zero-th storage region of the first register; a unit image signal in the zero-th storage region of the second register is stored in the second storage region of the second register; a unit image signal in the first storage region of the second register is stored in the first storage region of the first register and the first storage region of the second register; a unit image signal in the second storage region of the second register is stored in the second storage region of the first register; and a unit image signal in the third storage region of the second register is stored in the third storage region of the first register and the third storage region of the second register.

According to an eleventh aspect, a signal processing circuit of an image input apparatus comprises: storage means provided with a plurality of storage regions of the same number of bits as a unit image signal in predetermined units that is obtained by an image pickup device in the image input apparatus and arranged in two dimensions, wherein the unit image signal is one of a plurality of components forming a predetermined unit of arrangement of color components, and counterclockwise rotation means with which, in response to input of a predetermined counterclockwise rotation instruction signal, an array of a unit image signal that is stored in the storage regions of the storage means is rotated 90 degrees counterclockwise, while maintaining the unit of arrangement of color components, and then stored in the storage regions of the storage means.

According to a twelfth aspect, the signal processing circuit of an image input apparatus of the eleventh aspect has the feature that: the unit of arrangement of color components is composed of one brightness component and two color components of which frequency in the horizontal or vertical allocation is one-half the frequency in the horizontal or vertical allocation of the brightness component; and a register group is provided as the storage means, the register group having the first and second registers, each of the first and second registers having the zero-th to third storage regions storing the brightness component and the two color components, and wherein: in response to input of the counterclockwise rotation instruction signal, with the counterclockwise rotation means, a unit image signal in the zero-th storage region of the first register is stored in the second storage region of the first register; a unit image signal in the second storage region of the first register is stored in the second storage region of the second register; a unit image signal in the zero-th storage region of the second register is stored in the zero-th storage region of the first register; a unit image signal in the first storage region of the second register is stored in the first storage region of the first register and the first storage region of the second register; a unit image signal in the second storage region of the second register is stored in the zero-th storage region of the second register; and a unit image signal in the third storage region of the second register is stored in the third storage region of the first register and the third storage region of the second register.

According to a thirteenth aspect, a signal processing circuit of an image input apparatus comprises first and second storage means provided with a plurality of storage regions of the same number of bits as a unit image signal in predetermined units that is obtained by an image pickup device in the image input apparatus and arranged in two dimensions, wherein: the unit image signal is one of a plurality of components forming a predetermined unit of arrangement of color components; and the storage regions of the first storage means and the storage regions of the second storage means are directly connected one another by a predetermined connecting line, such that each of unit image signals stored in the storage regions in order to form a first unit of arrangement of color components in the first storage means, is converted to a second unit of arrangement of color components, and then stored in the storage regions of the second storage means.

According to a fourteenth aspect, the signal processing circuit of an image input apparatus of the thirteenth aspect has the feature that: the first and second unit of arrangement of color components are composed of one brightness component and two color components of which frequency in the horizontal or vertical allocation is one-half the frequency in the horizontal or vertical allocation of the brightness component; and a first register is provided as the first storage means; and a second register is provided as the second storage means, each of the first and second registers having the zero-th to third storage regions storing the brightness component and the two color components; and wherein: zero-th storage region of first register is connected directly to the zero-th storage region of the second register by a predetermined connecting line; the first storage region of the first register is connected directly to the second storage region of the second register by a predetermined connecting line; the second storage region of the first register is connected directly to the first storage region of the second register by a predetermined connecting line; and the third storage region of the first register is connected directly to the third storage region of the second register by a predetermined connecting line.

With the first aspect, because image rotation processing can be conducted without converting the data length of a unit image signal, the step of converting the data length and a data transfer therefor are not required, thus enabling to perform processing at a high speed and a low power consumption.

With the second aspect, image reflection processing can be conducted without converting the data length of a unit image signal, thereby enabling to perform processing at a high speed and a low power consumption.

With the third aspect, processing of rotating 90 degrees clockwise can be conducted at a high speed, by inputting a unit image signal that is arranged in two dimensions and stored in the main memory, to the second register group such as to be reflected vertically with respect to the arrangement, and transferring it to the first register group. Thereby, the step of converting the data length is not required, thus enabling to perform the processing of rotating 90 degrees clockwise, at a high speed and a low power consumption.

With the fourth aspect, by transferring an image signal from the third register group to the second register group, processing of rotating 90 degrees counterclockwise can be conducted at a high speed and a low power consumption, without converting the data length of a unit image signal. In addition, by transferring an image signal from the second register group to the first register group, there is no need to convert the data length of a unit image signal, and thus reflection processing made for input to the third register group can be conducted at a high speed and a low power consumption.

With the fifth aspect, by transferring an image signal inputted to the third register group, to the second register group, there is no need to convert the data length of a unit image signal, and thus reflection processing can be conducted at a high speed and a low power consumption.

With the sixth or seventh aspect, even for image having a unit of arrangement of color components, it is unnecessary to convert the data length of a unit image signal. This enables to conduct processing of rotating 90 degrees clockwise, or 90 degrees counterclockwise, at a high speed and a low power consumption.

With the seventh aspect, even when an image signal of which unit of arrangement of color components is composed of one brightness component and two color components of which frequency in the horizontal or vertical allocation is one-half that of the brightness component (for example, in a video data in a format of "YCbYCr"), there is no need to convert the data length of a unit image signal. It is therefore possible to conduct processing of rotating 90 degrees clockwise, at a high speed and a low power consumption.

With the eighth aspect, even when an image signal of which unit of arrangement of color components is composed of one brightness component and two color components of which frequency in the horizontal or vertical allocation is one-half that of the brightness component (for example, in a video data in a format of "YCbYCr"), it is possible to conduct processing of rotating 90 degrees counterclockwise, at a high speed and a low power consumption.

With the ninth or tenth aspect, there is no need to convert the data length of a unit image signal, thus enabling to conduct processing of rotating 90 degrees clockwise, at a high speed and a low power consumption. In addition, because an image signal of a storage means is rotated 90 degrees clockwise, and then returned to this storage means, there is no need to provide a plurality of storage means, resulting in an inexpensive circuit.

With the eleventh or twelfth aspect, there is no need to convert the data length of a unit image signal, thus enabling to conduct processing of rotating 90 degrees counterclockwise, at a high speed and a low power consumption. In addition, because an image signal of a storage means is rotated 90 degrees counterclockwise, and then returned to this storage means, there is no need to provide a plurality of storage means, resulting in an inexpensive circuit.

With the thirteenth or fourteenth aspect, there is no need to convert the data length of a unit image signal, thus enabling to conduct conversion of arrangement of color components, at a high speed and a low power consumption.

An object of the present invention is to overcome the foregoing problem in the conventional technique by providing an image processing circuit of an image input apparatus that can perform high-speed image processing, such as rotation, reflection, and conversion of arrangement of color components.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3(A) to 3(F) are diagrams illustrating a rotation processing in the coprocessor of the first preferred embodiment;

FIGS. 4(A) to 4(C) are diagrams illustrating a reflection processing in the coprocessor of the first preferred embodiment;

FIG. 7 is a diagram illustrating a clockwise rotation processing by the coprocessor of the second preferred embodiment;

FIG. 9 is a diagram illustrating a counterclockwise rotation processing by the coprocessor of the third preferred embodiment;

FIG. 13 is a diagram illustrating a counterclockwise rotation processing by the coprocessor of the fifth preferred embodiment; and FIG. 14 is a diagram illustrating schematically register groups of a coprocessor and a connection between registers in their respective register groups, according to a sixth preferred embodiment.

DESCRIPTION OF THE PREFERRED EMBODIMENTS

Preferred embodiments of the present invention will now be described with reference to the accompanying drawings.

First Preferred Embodiment

Figure 1:
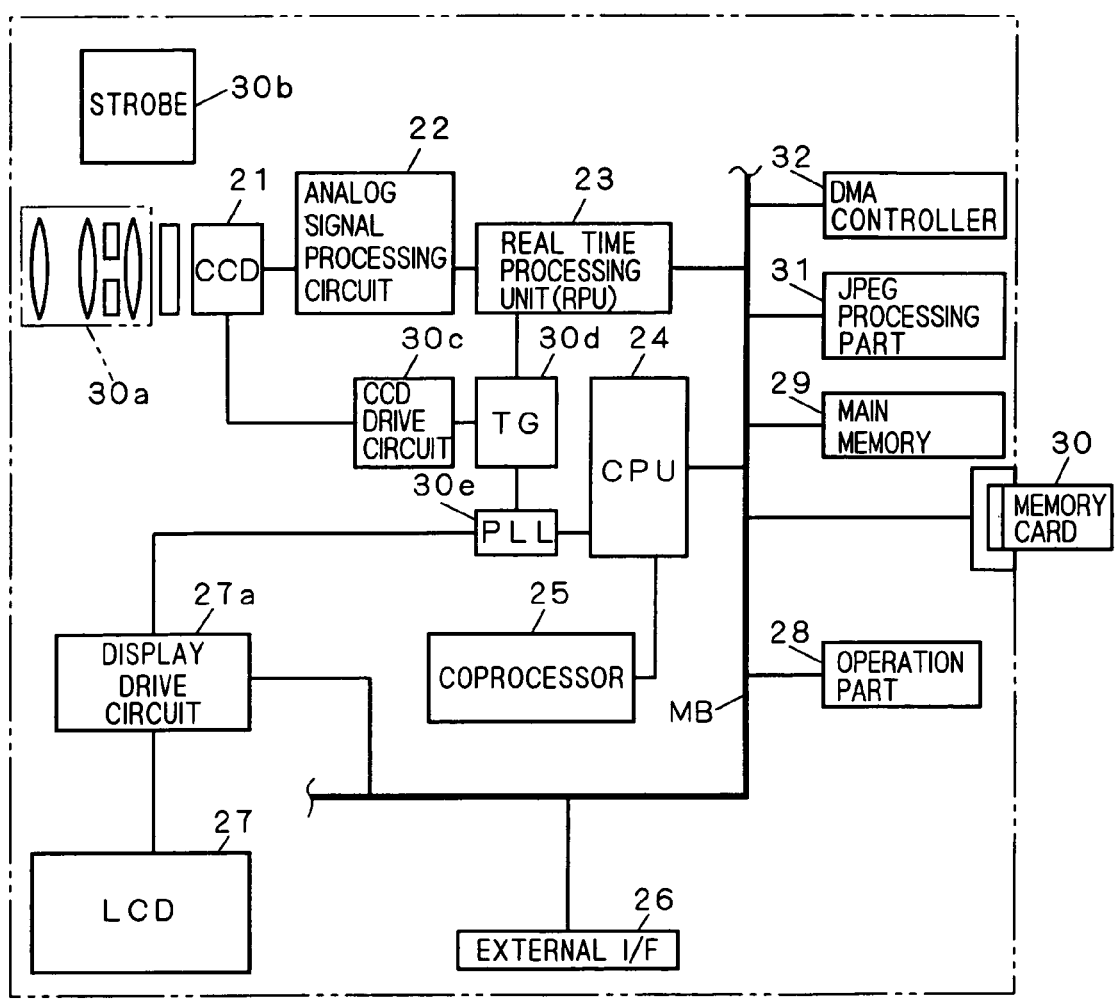
FIG. 1 is a diagram of a digital still camera according to one preferred embodiment of the present invention.

FIG. 1 is a diagram of a digital still camera according to one preferred embodiment of the present invention. In the digital still camera, as shown in FIG. 1, the image photographed by a CCD (image pickup device) 21 is read by an analog signal processing circuit 22 for analog-digital conversion. To the digitized image, a predetermined general image processing, such as pixel interpolation, color transformation, contour intensification, filtering and pixel skipping, is performed by real time processing at high speed in a real time processing unit (RPU) 23, and an exceptional image processing including rotation, reflection, conversion of arrangement of color components and JPEG compression, is executed by a CPU (central processing unit) 24 and a coprocessor 25 corresponding to a signal processing circuit of the present invention. The obtained image is outputted to a predetermined processor (personal computer, etc.) via an external interface (I/F) 26, and also displayed on a LCD 27 as a finder, through a display drive circuit 27a. Alternatively, it is stored in a general main memory 29, such as a DRAM, SDRAM, etc. At this time, the image display on the finder (LCD27) is executed in such a manner that, for supplying image to the finder (LCD 27), a predetermined processing such as a slight resolution reduction is performed by the real time processing unit 23, and image is outputted one after another. When the operator pushes a shutter release button, etc. (not shown) on an operation part 28, a detailed image residing in the main memory 29 is stored at a stroke in storage media, e.g., a memory card 30.

As to image provided through the analog signal processing circuit 22, when a real time processing is executed, the intermediate pixel array data is not stored in the main memory 29 but directly processed by the RPU 23. On the other hand, when no real time processing is executed, based on various image processing instructions (a clockwise rotation instruction and counterclockwise rotation instruction to be described later) which are given by the operator through the operation part 28, the mentioned rotation, reflection, conversion of arrangement of color components, and JPEG compression processing are conducted by the CPU 24 and coprocessor 25, and the resulting data is temporarily stored, as a pixel array data, in a CCD data buffer (not shown) of the main memory 29. The pixel array data is inputted to the real time processing unit 23 by direct memory access (DMA), to achieve a high speed processing. Herein, the CPU 24 contains a 32-bit length register and performs a data processing in 32-bit (one word) units. Of the mentioned processing not to be made in real time, rotation, reflection, and conversion of arrangement of color components processing are not conducted in the CPU 24 by software, but they are conducted by the coprocessor 25 that is provided with a circuit for these processing (described in detail later), at a high speed and a low power consumption.

The real time processing unit 23, CPU 24, external interface 26 are connected to a main bus MB, together with the main memory 29, memory card 30 and JPEG processing part 31. In order to reduce the load on the CPU 24 upon data interchange among these elements, data interchange via the main bus MB is made between the respective elements under control of a direct memory access (DMA) controller 32, not through the CPU 24.

In FIG. 1, there are shown an optical mechanism 30a that has a lens with auto focus function, an aperture device, etc.; strobe 30b, CCD drive circuit 30c driving the CCD 21; timing generator (TG) 30d that regulates operation timing of the real time processing unit 23 and CCD drive circuit 30c; and PLL oscillator circuit 30e.

Figure 2:
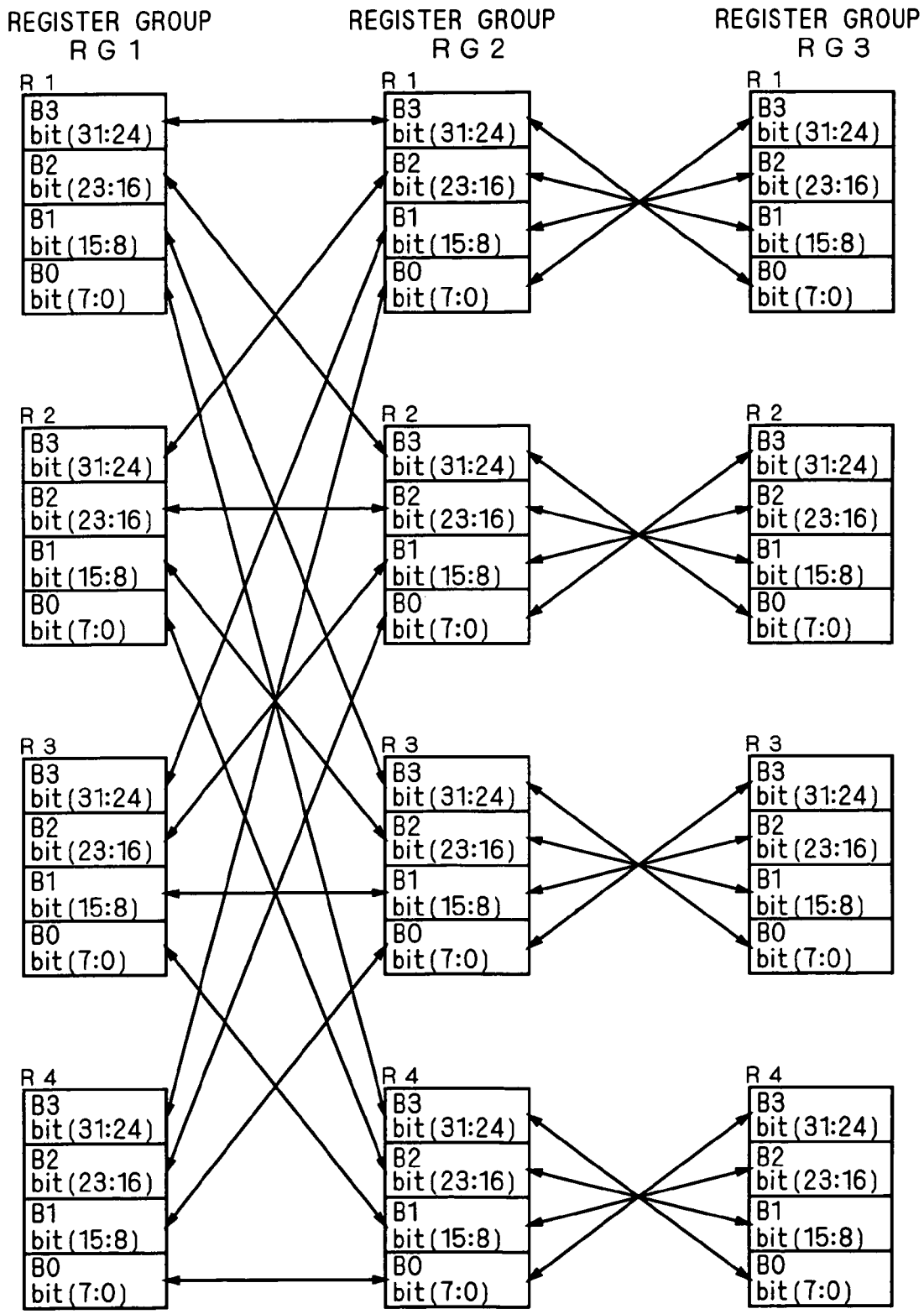
FIG. 2 is a diagram illustrating register groups of a coprocessor and a connection between registers in their respective register groups, according to a first preferred embodiment.

Description will now be made of a coprocessor 25 that is a major part of the invention. FIG. 2 is a diagram illustrating register groups of a coprocessor 25 and a connection between registers in their respective register groups. As shown in FIG. 2, the coprocessor 25 has register groups RG1 to RG3 that correspond to storage means of the invention. Each register group has four registers corresponding to storage elements. That is, each of the register groups RG1 to RG3 has registers R1 to R4. Each of the registers R1 to R4 is a register of 32 bits, namely, one-word (four bytes).

In this digital still camera, an image data in pixel units is a monochromatic gradation signal expressed by eight bits (one byte). In each register, each of the zero-th byte B0 to the third byte B3 reads eight bits (one byte). Assuming that the bits of the registers are called the zero-th bit to the 31st bit, the zero-th to 7th bits, the 8th to 15th bits, the 16th to 23rd bits, and the 24th to 31st bits, are called the zero-th byte B0, first byte B1, second byte B2, and third byte B3, respectively. An image data is read in one-pixel units (corresponding to a unit image signal in the invention) per byte. That is, in each of the registers R1 to R4 of the register groups RG1 to RG3, each pixel's image data is stored in a region that has the same number of bits as an image data of one pixel, as a unit.

The registers R1 to R4 of the respective register groups RG1 to RG3 are directly and electrically connected to the CPU 24, in order to read an image data from the CPU 24, alternatively, output an image data to the CPU 24. Thereby, each of the bytes B0 to B3 of the registers R1 to R4 in the register groups RG1 to RG3, is connected indirectly to the main memory 29 through the CPU 24.

The zero-th byte B0 to the third bytes B3 of the registers R1 to R4 between the register groups RG1 and RG2, and between the register groups RG2 and RG3, are directly and electrically connected one another, by a predetermined connecting line, as described below. Specifically, the zero-th bytes B0 of all the registers of the register group RG1 are connected to the zero-th byte B0 to third byte B3 of the register R4 of the register group RG2; the first byte B1s of all the registers of the register group RG1 are connected to the zero-th byte B0 to third byte B3 of the register R3 of the register group RG2; the second bytes B2 of all the registers of the register group RG1 are connected to the zero-th byte B0 to third byte B3 of the register R2 of the register group RG2; and the third bytes B3 of all the registers of the register group RG1 are connected to the zero-th byte B0 to third byte B3 of the register R1 of the register group RG2. The zero-th byte B0 to third byte B3 of the register R1 of the register group RG2 are respectively connected to the third byte B3 to zero-th byte B0 of the register R1 of the register group RG3; the zero-th byte B0 to third byte B3 of the register R2 of the register group RG2 are respectively connected to the third byte B3 to zero-th byte B0 of the register R2 of the register group RG3; the zero-th byte B0 to third byte B3 of the register R3 of the register group RG2 are respectively connected to the third byte B3 to zero-th byte B0 of the register R3 of the register group RG3; and the zero-th byte B0 to third byte B3 of the register R4 of the register group RG2 are respectively connected to the third byte B3 to zero-th byte B0 of the register R4 of the register group RG3.

The respective register groups are connected in this manner, therefore, by transferring an image data between the register groups as illustrated below, an image processing such as a clockwise 90 degrees rotation, a counterclockwise 90 degrees rotation, or reflection in the right-to the left direction (horizontal direction), with respect to image, can be conducted at a high speed.

FIGS. 3(A) to 3(F) are diagrams illustrating a rotational processing by a coprocessor 25 according to a first preferred embodiment, in which FIGS. 3(A) to 3(C) illustrate a clockwise 90 degrees rotation, and FIGS. 3(D) to 3(F) illustrate a counterclockwise 90 degrees rotation. Firstly, a 4-word image data stored in a main memory 29, as shown in FIG. 3(A), is read in a register group RG2 through a CPU 24, as shown in FIG. 3(B). That is, although bytes B0 to B3 of registers R1 to R4 of the register group RG2 are not illustrated, they are connected to the main memory 29, through the CPU 24, so that an image data is reflected vertically. Then, the image data of the register group RG2 is transferred to a register group RG1 as shown in FIG. 3(C). A comparison of FIG. 3(A) with 3(C) indicates that the 4-word image data is rotated 90 degrees clockwise. Thus, when an image data is outputted from the register group RG1, an image data rotated 90 degrees clockwise can be obtained.

Similarly, a 4-word image data stored in the main memory 29 as shown in FIG. 3(D), is read in a register group RG3 through the CPU 24, as shown in FIG. 3(E), and then transferred to the register group RG1 through the register group RG2, resulting in such an array as shown in FIG. 3(F). A comparison of FIG. 3(E) with 3(F) indicates that the 4-word image data is rotated 90 degrees counterclockwise. Thus, when an image data is outputted from the register group RG1, an image data rotated 90 degrees counterclockwise can be obtained.

FIGS. 4(A) to 4(C) are diagrams illustrating a reflection processing by a coprocessor 25 according to the first preferred embodiment. Firstly, a 4-word image data stored in a main memory 29 as shown in FIG. 4(A), is read in a register group RG3 as shown in FIG. 4(B), and then transferred to a register group RG2 as shown in FIG. 4(C). A comparison of FIG. 4(A) with 4(C) indicates that the 4-word image data is reflected horizontally (symmetrically) about a vertical centerline CL (i.e., the line extending through between a first byte B1 and second byte B2 of each register). Thus, when an image data is outputted from the register group RG2, an image data reflected horizontally (symmetrically) can be obtained.

As apparent from FIG. 2, a single connecting line extends from each byte of the registers of the register groups. That is, each byte of one register of one register group is connected to any byte of any one register of other register group by a connecting line, resulting in one-to-one correspondence. This permits a bi-directional image data transfer between any two register groups of the register groups RG1 to RG3. It is therefore possible to perform transfer from the register group RG2 to the register group RG1, transfer from the register group RG3 to the register group RG2, and further, transfer from the register group RG3 to the register group RG1, through the register group RG2. This permits the reverse conversions of the mentioned respective conversions, that is, a counterclockwise 90 degrees rotation by transfer from the register group RG2 to the register group RG1; reflection about the centerline CL by transfer from the register group RG2 to the register group RG3; and a clockwise 90 degrees rotation by transfer from the register group RG3 to the register group RG1, through the register group RG2.

Processing of a vertical refection, that is, reflection horizontally (symmetrically) about a horizontal straight line in image that is located between a register R2 and R3 of each register group RG1 through RG3, is realized in the CPU 24 by software, because there is no great difference in speed from the case of realizing with a circuit configuration. This reflection processing can also be realized easily by electrically connecting two register groups by a predetermined connecting line and transferring an image data therebetween.

Additionally, in the coprocessor 25, an image data having multiple components forming a color grouped in pixel units can be converted to an image data in which an image data of multiple pixels is compounded in component units, on the contrary, a compounded image data can be separated into an image data in pixel units having multiple components.

Figure 5A:
FIGS. 5(A) and 5(B) are diagrams illustrating a state that a color data is compounded or separated in the first preferred embodiment.
Figure 5B:

FIGS. 5(A) and 5(B) are diagrams illustrating a state that a color data is compounded or separated, according to the first preferred embodiment. Specifically, there are shown that a color data is compounded or separated in order to convert a data format between a compound pixel data in which two pixels are expressed in 32 bits, and a 32-bit image data per component in a unit of arrangement of color components (described later) of the compound pixel data. The compound pixel data handled herein is a 32-bit color image data expressing two pixels as a unit, and has a unit of arrangement of color components that is an array serving as a unit of multiple components of a group expressing a color. The unit of arrangement of color components is composed of one brightness component (Y component) and two color components of which frequency in the horizontal or vertical allocation is one-half that of the brightness component (i.e., the number of data is half). In the first preferred embodiment, there is used a unit pixel data in a format in which each component is arranged vertically, and a 32-bit compound pixel data is formed by adding two pixels of an 8-bit Y component as an image data expressing two pixels, an 8-bit Cy component (a color-difference signal obtained by subtracting the brightness component from a blue component), and an 8-bit Cb component (a color-difference signal obtained by subtracting the brightness component from a red component), which are common to the two pixels of Y component. This compound image data is then converted to a 32-bit image data that is grouped per component.

In the above processing of compounding or separating components forming a color, the compound pixel data is stored in the respective registers R1 to R4 of the register groups RG2 and RG1. That is, in the registers R1 to R4 of the register groups RG1 and RG2, each component data is stored in storage regions (the zero-th to third bytes) having the same number of bits as a one-component image data (Y, Cb or Cr component in this example), which serves as a unit corresponding to a unit image signal of the invention.

As shown in FIG. 5(A), an image data of the respective components of Y, Cb, Y and Cr is read in registers R1 to R4 of a register group RG2, and then transferred to a register group RG1, thereby an image data compounded in pixel units is generated in the registers R1 to R4 of the register group RG1, respectively. On the contrary, an image data in units of two pixels having the respective components of Y, Cb, Y and Cr, is read in registers R1 to R4 of a register group RG2, and then transferred to the register group RG1, thereby an image data composed of four pixels that are separated into the components of Y, Cb, Y and Cr, respectively, is generated in the registers R1 to R4 of the register group RG1. This shows that compounding or separation of a color data is executable by employing the functions of a clockwise 90 degrees rotation, and a counterclockwise 90 degrees rotation, as mentioned earlier.

Since the above conversion processing by the coprocessor 25 is reversible as previously described, it is possible to separate or compound components forming a color of an image data, even when such an image data as mentioned is conversely read in the register group RG1, and then transferred to the register group RG2.

As stated in the foregoing, the first preferred embodiment is characterized in that, in the register groups RG1 to RG3, storage regions having the same number of bits (one byte) as an image data serving as a unit, that is, the bytes of the registers R1 to R4, are directly connected one another in the mentioned connection relationship. Thereby, a clockwise 90 degrees rotation, a counterclockwise 90 degrees rotation, reflection horizontally (symmetrically) about a centerline, and compounding or separation of components of a color image data, can be conducted by transfer of an image data among the register groups RG1 to RG3. When such processing is conducted in the CPU 24 by software, an image data as a unit is required to be converted from an 8-bit to a 32-bit data. Whereas in the first preferred embodiment, there is no need to covert the data length of an image data as a unit, thereby the step of converting the data length and a data transfer therefor are not required. This enables to conduct the processing at a high speed and a low power consumption.

Second Preferred Embodiment

A second preferred embodiment has the same configuration as the first preferred embodiment shown in FIG. 1, except for a coprocessor 25. In the coprocessor 25, an image data provided from a CPU 24 is rotated 90 degrees clockwise. The construction and processing of the coprocessor 25 will be described as below.

Figure 6:
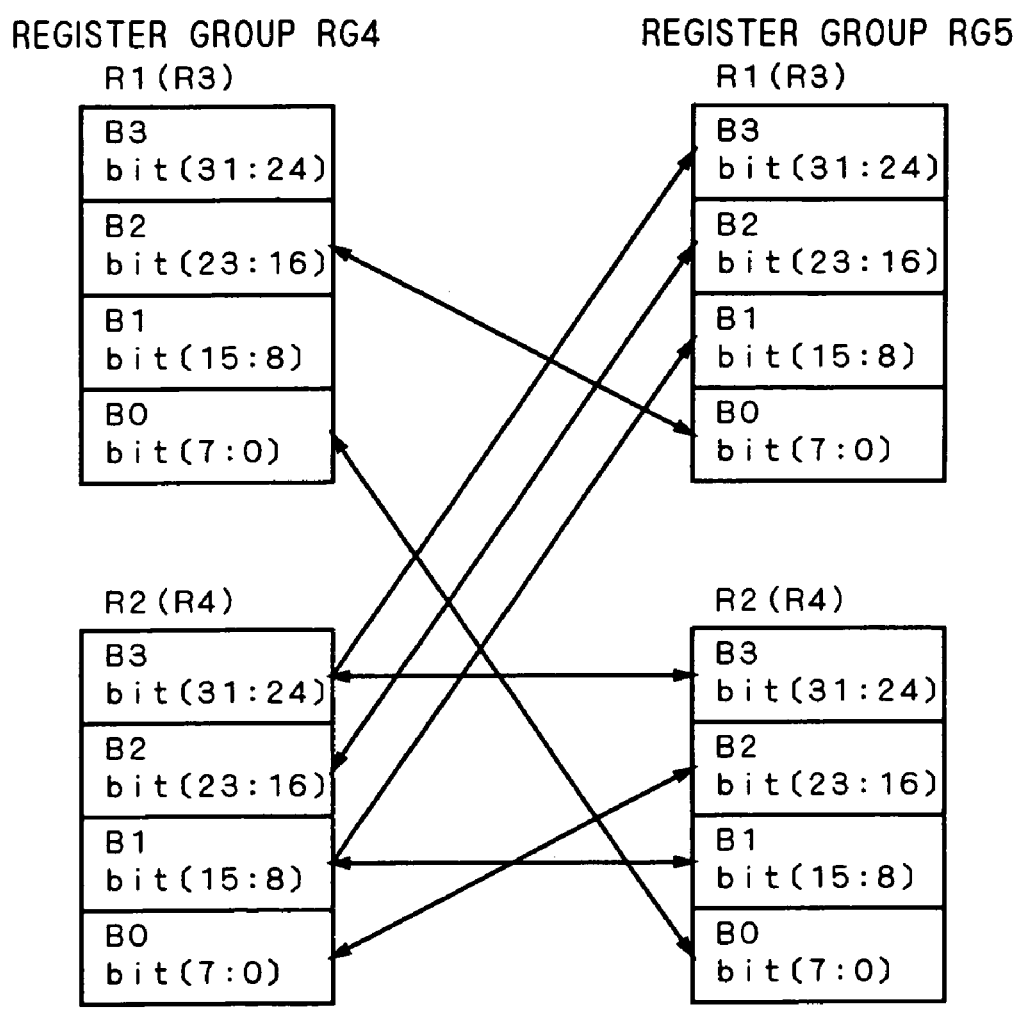
FIG. 6 is a diagram illustrating register groups of a coprocessor and a connection between registers in their respective register groups, according to a second preferred embodiment.

FIG. 6 is a diagram illustrating register groups of a coprocessor 25 and a connection between registers in these register groups. The coprocessor of the second preferred embodiment has register groups RG4 and RG5, each having four 32-bit registers similar to the register groups RG1 to RG3 of the first preferred embodiment. In the second preferred embodiment, registers R1, R2 and registers R3, R4 in the register groups RG4 and RG5, have totally the same connection relationship, and therefore, only the registers R1 and R2 are illustrated as a representative.

In the second preferred embodiment, a compound pixel data (a video data) in which two pixels are expressed in 32 bits (for example, in arrangement of color components of "YCbYCr," each component is expressed in eight bits) is stored in registers R1 to R4 of register groups RG4 and RG5. A compound pixel data handled herein is the same as that in the first preferred embodiment. In the respective registers R1 to R4 of the register groups RG4 and RG5, each component data is stored in storage regions (the zero-th to third bytes) which have the same number of bits as a one-component image data serving as a unit corresponding to a unit image signal of the invention (in the above example, Y, Cb or Cr component).

The respective bytes of the registers R1 and R2 (R3 and R4) of the register groups RG4 and RG5 are directly and electrically connected one another by a predetermined connecting line. Specifically, the zero-th byte B0 of the register R1 of the register group RG4 is connected to the zero-th byte B0 of the register R2 of the register group RG5; the second byte B2 of the register R1 of the register group RG4 is connected to the zero-th byte B0 of the register R1 of the register group RG5; the zero-th byte B0 of the register R2 of the register group RG4 is connected to the second byte B2 of the register R2 of the register group RG5; the first byte B1 of the register R2 of the register group RG4 is connected to the first byte B1 of the register R1 of the register group RG5 and to the first byte B1 of the register R2 of the register group RG5; the second byte B2 of the register R2 of the register group RG4 is connected to the second byte B2 of the register R1 of the register group RG5; and the third byte B3 of the register R2 of the register group RG4 is connected to the third byte B3 of the register R1 of the register group RG5 and to the third byte B3 of the register R2 of the register group RG5.

FIG. 7 is a diagram illustrating a clockwise rotation processing by a coprocessor 25, in the second preferred embodiment. The fact that registers R1 and R2, and the registers R3 and R4, are connected in the same fashion as described, means that a clockwise 90 degrees rotation with respect to four pixels that are expressed in two registers, namely, a video data in 16-bit units, is conducted in parallel with respect to eight pixels. Accordingly, description will be made of rotation in the registers R3 and R4 as a representative. In FIG. 7, the symbol given in each byte of the registers designates one of the components (Y, Cb, Y and Cr components), and the following number designates one of eight pixels (the zero-th to seventh pixels).

Of registers R3 and R4, consider now only the zero-th byte B0 and the second byte B2, each storing Y component. After data transfer from the register group RG4 to RG5, Y0 to Y3 are rotated so that Y0 moves to the original position of Y1, Y1 moves to the original position of Y3, Y2 moves to the original position of Y0, and Y3 moves to the original position of Y2. As to Cb component and Cr component, in order not to disorder the array of Y, Cb, Y and Cr components, it is necessary that Cb component is disposed in the first byte B1 of each register, and Cr component is disposed in the third byte B3 of each register. Therefore, Cb0 and Cr1 that are originally stored in the first byte B1 and the third byte B3 of the register R4, are copied directly to the register R3. Accordingly, it is apparent that the compound pixel data is rotated 90 degrees clockwise, by this conversion. This is true for the registers R1 and R2.

As stated above, the second preferred embodiment is characterized in that, in the register groups RG4 and RG5, the storage regions having the same number of bits (one byte) as an image data serving as a unit, that is, each byte of the respective registers R1 to R4, are directly connected one another in the mentioned connection relationship. Thereby, a clockwise 90 degrees rotation, can be conducted by image data transfer between the register groups R4 and R5. As compared to the case that such processing is conducted in the CPU 24 by software, there is no need to covert the data length of each component data that composes a color as a unit, thereby the step of converting the data length and a data transfer therefor are not required. This enables to conduct the processing at a high speed and a low power consumption.

Third Preferred Embodiment

A third preferred embodiment has the same configuration as the first preferred embodiment shown in FIG. 1, except for a coprocessor 25. In the coprocessor 25, an image data provided from a CPU 24 is rotated 90 degrees counterclockwise. The construction and processing of the coprocessor 25 will be described as below.

Figure 8:
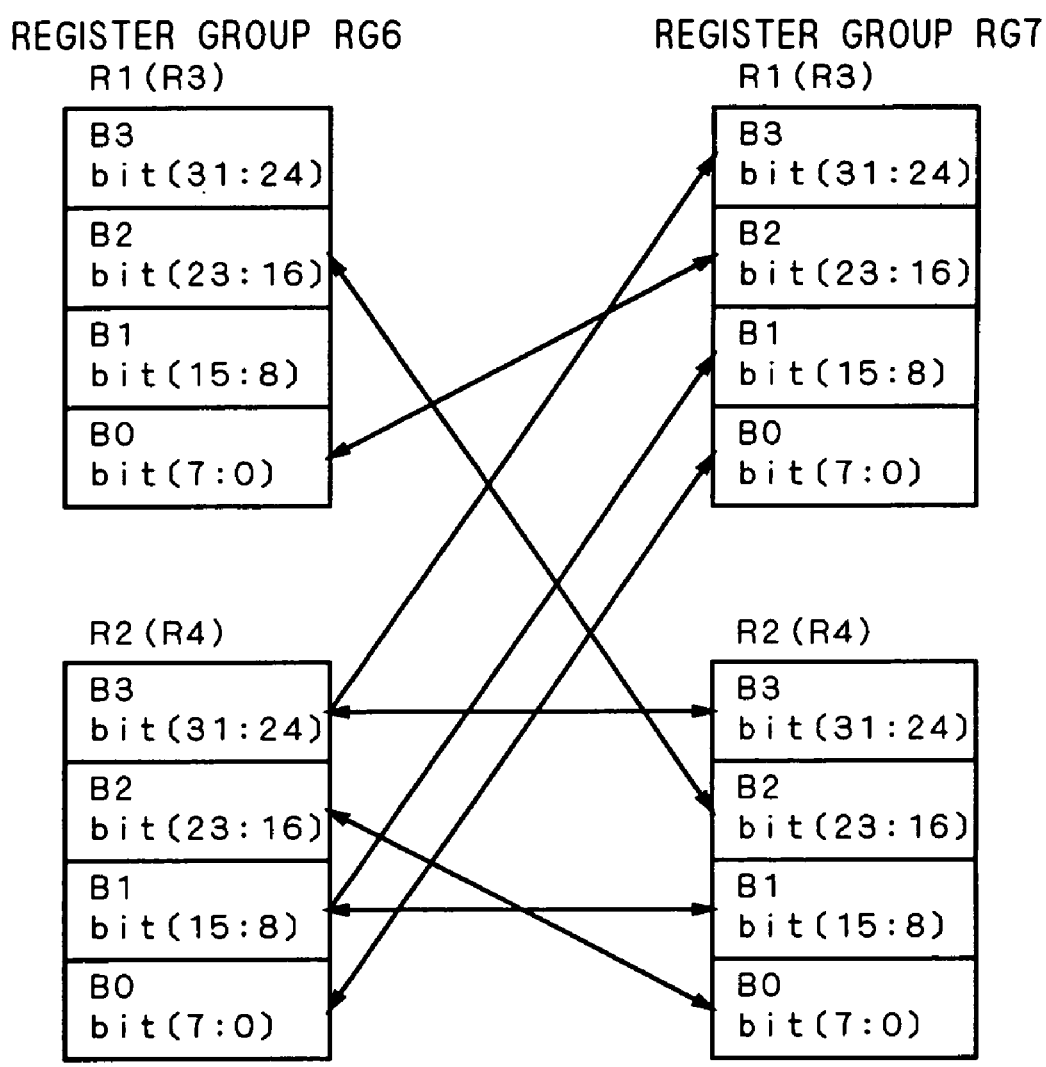
FIG. 8 is a diagram illustrating register groups of a coprocessor and a connection between registers in their respective register groups, according to a third preferred embodiment.

FIG. 8 is a diagram illustrating register groups of a coprocessor 25 and a connection between registers in these register groups. The coprocessor of the third preferred embodiment has register groups RG6 and RG7, each having the same configuration as the register groups RG4 and RG5 in the second preferred embodiment. Like the second preferred embodiment, registers R1, R2 and registers R3, R4 in the register groups RG6 and RG7, have totally the same connection relationship, and therefore, only the registers R1 and R2 are illustrated as a representative.

In the third preferred embodiment, a compound pixel data (a video data) in which two pixels are expressed in 32 bits (for example, in arrangement of color components of "YCbYCr," each component is expressed in eight bits) is stored in registers R1 to R4 of the register groups RG6 and RG7. A compound pixel data handled herein is the same as that in the first preferred embodiment. In the respective registers R1 to R4 of the register groups RG6 and RG7, each component data is stored in storage regions (the zero-th to third bytes) which have the same number of bits as a one-component image data serving as a unit corresponding to a unit image signal of the invention (in the above example, Y, Cb or Cr component).

The respective bytes of each register of the register groups RG6 and RG7 are directly and electrically connected one another by a predetermined connecting line. Specifically, the zero-th byte B0 of the register R1 of the register group RG6 is connected to the second byte B2 of the register R1 of the register group RG7; the second byte B2 of the register R1 of the register group RG6 is connected to the second byte B2 of the register R2 of the register group RG7; the zero-th byte B0 of the register R2 of the register group RG6 is connected to the zero-th byte B0 of the register R1 of the register group RG7; the first byte B1 of the register R2 of the register group RG6 is connected to the first byte B1 of the register R1 of the register group RG7 and to the first byte B1 of the register R2 of the register group RG7; the second byte B2 of the register R2 of the register group RG6 is connected to the zero-th byte B0 of the register R2 of the register group RG7; and the third byte B3 of the register R2 of the register group RG6 is connected to the third byte B3 of the register R1 of the register group RG7 and to the third byte B3 of the register R2 of the register group RG7.

FIG. 9 is a diagram illustrating a counterclockwise rotation processing by a coprocessor 25 in the third preferred embodiment. In the third preferred embodiment, a compound pixel data (a video data) similar to that in the second preferred embodiment, is rotated 90 degrees counterclockwise. Like the second preferred embodiment, of registers R3 and R4, consider now only the zero-th byte B0 and the second byte B2, each storing Y component. It is apparent that after data transfer from the register group RG6 to RG7, the compound pixel data is rotated 90 degrees counterclockwise. As to Cb component and Cr component, data is processed in the same manner as in the second preferred embodiment. This is true for the registers R1 and R2.

As stated above, the third preferred embodiment is characterized in that, in the register groups RG6 and RG7, the storage regions having the same number of bits (one byte) as a one-component image data serving as a unit, that is, each byte of the respective registers R1 to R4, are directly connected one another in the mentioned connection relationship. Thereby, a counterclockwise 90 degrees rotation, can be conducted by image data transfer between the register groups R4 and R5. As compared to the case that such processing is conducted in the CPU 24 by software, there is no need to covert the data length of each component data as a unit, thereby the step of converting the data length and a data transfer therefor are not required. This enables to conduct the processing at a high speed and a low power consumption.

Fourth Preferred Embodiment

A fourth preferred embodiment has the same configuration as the first preferred embodiment shown in FIG. 1, except for a coprocessor 25. In the coprocessor 25, an image data provided from a CPU 24 is rotated 90 degrees clockwise in exactly the same manner as in the second preferred embodiment, according to input of a predetermined clockwise rotation instruction. The construction and processing of the coprocessor 25 will be described as below.

Figure 10:
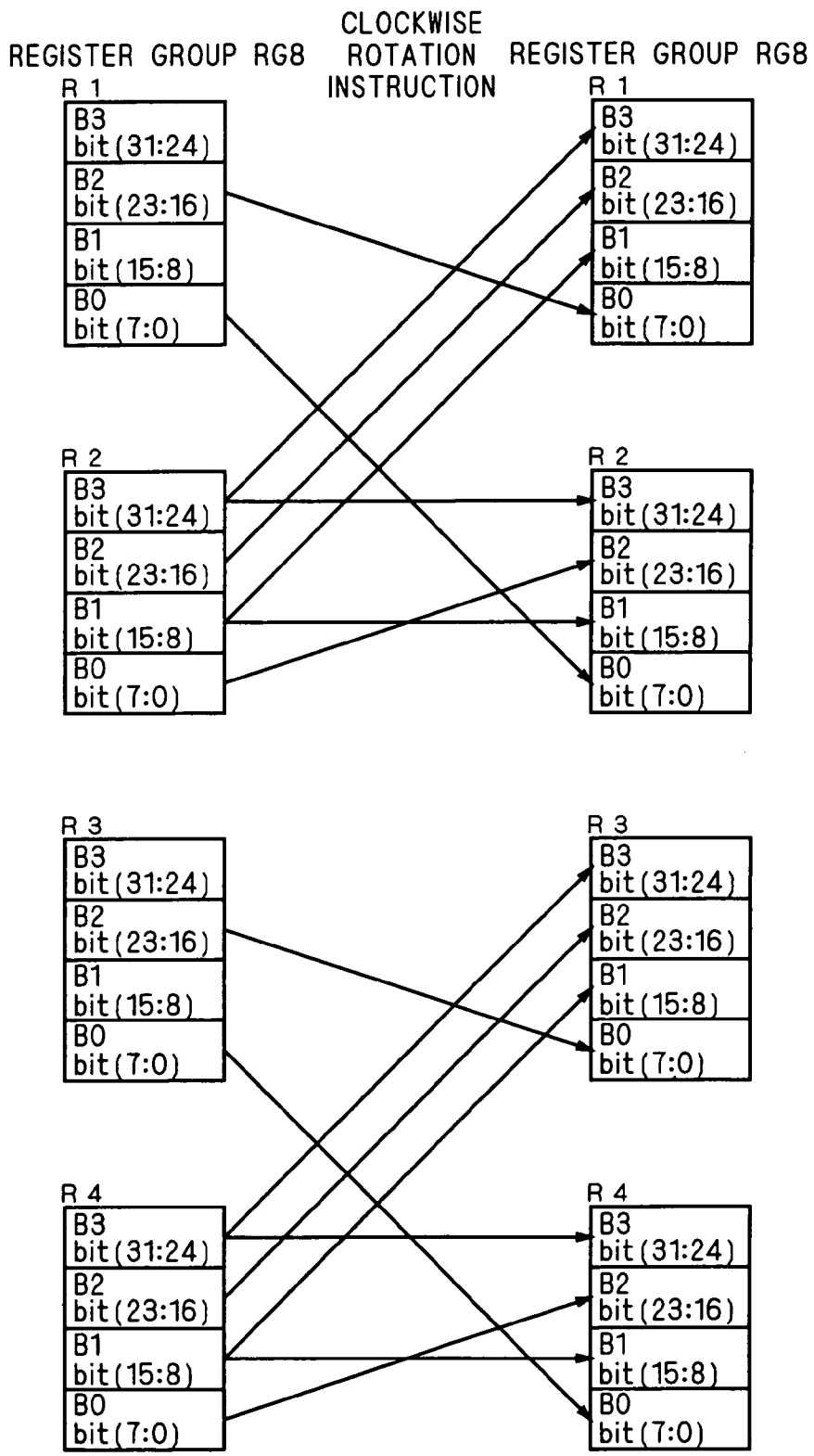
FIG. 10 is a diagram illustrating schematically register groups of a coprocessor and a connection relationship between registers in their respective register groups, according to a fourth preferred embodiment.

FIG. 10 is a diagram illustrating schematically register groups of a coprocessor 25 and a connection relationship between registers in these register groups, in the fourth preferred embodiment. The coprocessor of the fourth preferred embodiment has a register group RG8 comprising registers R1 to R4 similar to the register groups RG4 and RG5 in the second preferred embodiment. That is, there is provided only one register group. In FIG. 10, for the sake of convenience, two register groups RG8 are disposed in parallel.

In the fourth preferred embodiment, a compound pixel data (a video data) in which two pixels are expressed in 32 bits (for example, in arrangement of color components of "YCbYCr," each component is expressed in eight bits) is stored in the registers R1 to R4 of the register group RG8. A compound pixel data handled herein is the same as that in the first preferred embodiment. In the respective registers R1 to R4 of the register group RG8, each component data is stored in storage regions (the zero-th to third bytes) which have the same number of bits as a one-component image data serving as a unit corresponding to a unit image signal of the invention (in the above example, Y, Cb or Cr component).

The respective bytes of the registers R1 and R2 of the register group RG8 are directly and electrically connected one another by a predetermined connecting line (corresponding to a clockwise rotation means in the invention), in the following manner. Like the second preferred embodiment, the registers R1 and R2, and registers R3 and R4, have totally the same connection relationship. Specifically, the zero-th byte B0 of the register R1 is connected to the zero-th byte B0 of the register R2; the second byte B2 of the register R1 is connected to the zero-th byte B0 of the register R1; the zero-th byte B0 of the register R2 is connected to the second byte B2 of the register R2; the first byte B1 of the register R2 is connected to the first byte B1 of the register. R1 and to the first byte B1 of the register R2; the second byte B2 of the register R2 is connected to the second byte B2 of the register R1; and the third byte B3 of the register R2 is connected to the third byte B3 of the register R1 and to the third byte B3 of the register R2.

Each byte of the registers R1 to R4 of the register group RG8 can be switched by a selector (not shown) between input of an image data from the CPU 24, and input of an image data from the register group RG8.

With the registers R1 and R2 (R3 and R4) connected in the mentioned manner, when an image data is read from the CPU 24, and the operator inputs a clockwise rotation instruction through an operation block, its signal is inputted to the selector, and then input of the register group RG8 is switched to input between the registers R1 to R4, thereby performing the image data transfer. Specifically, an image data is transferred and stored from the zero-th byte B0 of the register R1 to the zero-th byte B0 of the register R2; from the second byte B2 of the register R1 to the zero-th byte B0 of the register R1; from the zero-th byte B0 of the register R2 to the second byte B2 of the register R2; from the first byte B1 of the register R2 to the first byte B1 of the register R1 and to the first byte B1 of the register R2; from the second byte B2 of the register R2 to the second byte B2 of the register R1; and from the third byte B3 of the register R2 to the third byte B3 of the register R1 and to the third byte B3 of the register R2, respectively.

Figure 11:
FIG. 11 is a diagram illustrating a clockwise rotation processing by the coprocessor of the fourth preferred embodiment.

FIG. 11 is a diagram illustrating a clockwise rotation processing by a coprocessor 25 in the fourth preferred embodiment. As shown in FIG. 11, a compound pixel data (a video data) in which two pixels are expressed in 32 bits (Y component, Cb component, Y component and Cr component are handled as a unit) is rotated 90 degrees clockwise and then stored by the inter-register transfer as described, as in the second preferred embodiment. As apparent from the result, in the fourth preferred embodiment, the compound pixel data rotated 90 degrees clockwise is returned and stored in the same register group RG8.

As stated above, the fourth preferred embodiment is characterized in that, in the register group RG8, the storage regions having the same number of bits (one byte) as a compound data serving as a unit, that is, each byte of the respective registers R1 to R4, are directly connected one another in the mentioned connection relationship. Thereby, according to input of a clockwise rotation instruction, a video data can be rotated 90 degrees clockwise, by inter-byte transfer in the register R1 and R2, or R3 and R4. As compared to the case that such processing is conducted in the CPU 24 by software, there is no need to covert the data length of each component data as a unit, thereby the step of converting the data length and a data transfer therefor are not required. This enables to conduct the processing at a high speed and a low power consumption.

Fifth Preferred Embodiment

A fifth preferred embodiment has the same configuration as the first preferred embodiment shown in FIG. 1, except for a coprocessor 25. In the coprocessor 25, an image data provided from a CPU 24 is rotated 90 degrees counterclockwise in exactly the same manner as in the third preferred embodiment, according to input of a predetermined counterclockwise rotation instruction. The construction and processing of the coprocessor 25 will be described as below.

Figure 12:
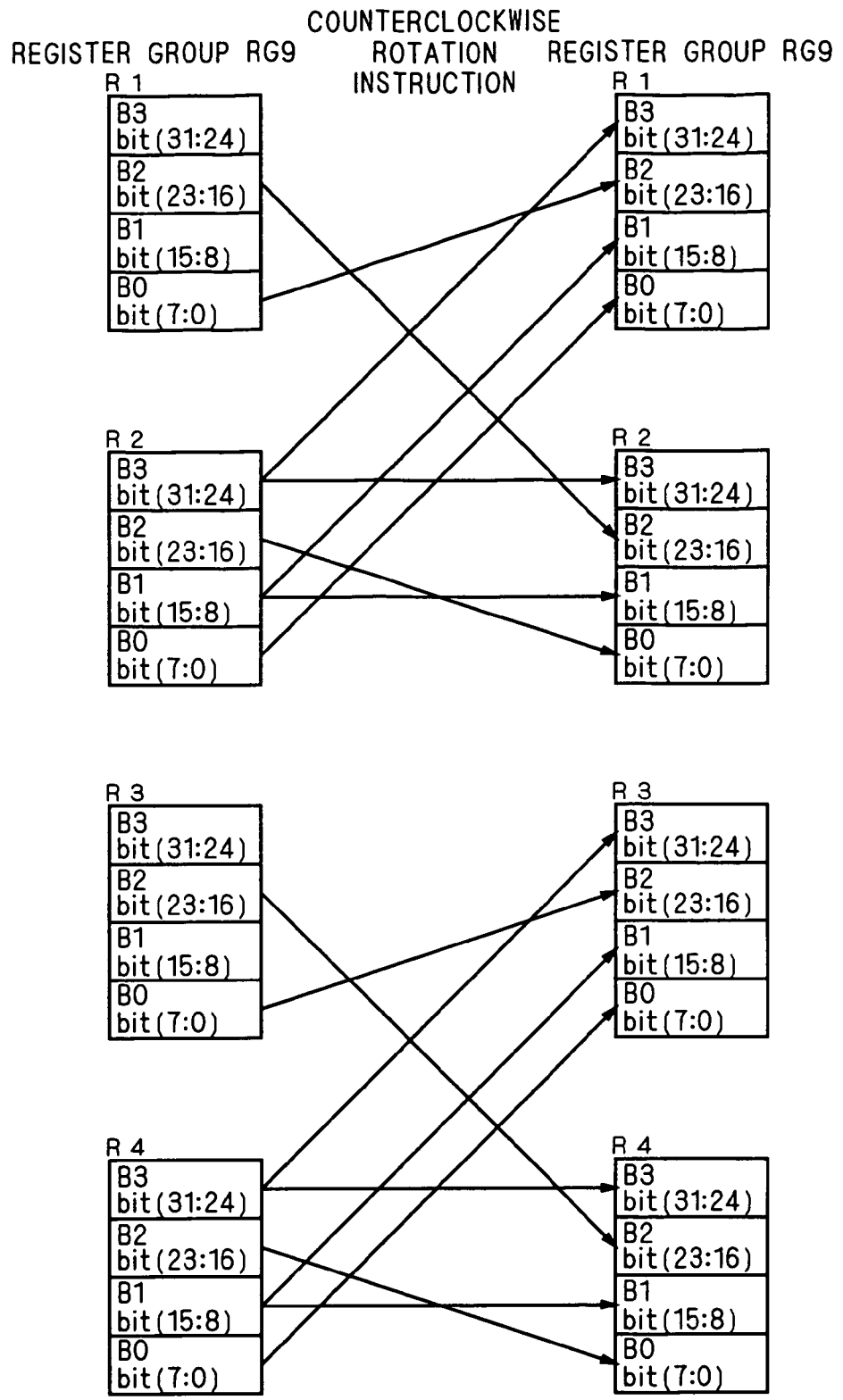
FIG. 12 is a diagram illustrating schematically register groups of a coprocessor and a connection relationship between registers in their respective register groups, according to a fifth preferred embodiment.

FIG. 12 is a diagram illustrating schematically register groups of a coprocessor 25 and a connection relationship between registers in these register groups, in the fifth preferred embodiment. The coprocessor of the fifth preferred embodiment has only a register group RG9 comprising registers R1 to R4 similar to the register group RG8 in the fourth preferred embodiment. In FIG. 12, for the sake of convenience, two register groups RG9 are disposed in parallel.

In the fifth preferred embodiment, a compound pixel data (a video data) in which two pixels are expressed in 32 bits (for example, in arrangement of color components of "YCbYCr," each component is expressed in eight bits) is stored in registers R1 to R4 of the register group RG9. A compound pixel data handled herein is the same as that in the first preferred embodiment. In the respective registers R1 to R4, each component data is stored in storage regions (the zero-th to third bytes) which have the same number of bits as a one-component image data serving as a unit corresponding to a unit image signal of the invention (in the above example, Y, Cb or Cr component).

The respective bytes of the registers R1 and R2 of the register group RG9 are directly and electrically connected one another by a predetermined connecting line (corresponding to a clockwise rotation means in the invention), in the following manner. Like the third preferred embodiment, the registers R1 and R2, and registers R3 and R4, have totally the same connection relationship. Specifically, the zero-th byte B0 of the register R1 is connected to the second byte B2 of the register R1; the second byte B2 of the register R1 is connected to the second byte B2 of the register R2; the zero-th byte B0 of the register R2 is connected to the zero-th byte B0 of the register R1; the first byte B1 of the register R2 is connected to the first byte B1 of the register R1 and to the first byte B1 of the register R2; the second byte B2 of the register R2 is connected to the zero-th byte B0 of the register R2; and the third byte B3 of the register R2 is connected to the third byte B3 of the register R1 and to the third byte B3 of the register R2. There is also provided with a selector (not shown) which is similar to that in the fourth preferred embodiment.

With the registers R1 and R2 (R3 and R4) connected in the mentioned manner, when an image data is read from the CPU 24, and the operator inputs a counterclockwise rotation instruction through an operation button, its signal is inputted to the selector, and then input of the register group RG9 is switched to input among the registers R1 to R4, thereby performing the image data transfer. Specifically, an image data is transferred and stored from the zero-th byte B0 of the register R1 to the second byte B2 of the register R1; from the second byte B2 of the register R1 to the second byte B2 of the register R2; from the zero-th byte B0 of the register R2 to the zero-th byte B0 of the register R1; from the first byte B1 of the register R2 to the first byte B1 of the register R1 and to the first byte B1 of the register R2; from the second byte B2 of the register R2 to the zero-th byte B0 of the register R2; and from the third byte B3 of the register R2 to the third byte B3 of the register R1 and to the third byte B3 of the register R2, respectively.

FIG. 13 is a diagram illustrating a counterclockwise rotation processing by a coprocessor 25 in the fifth preferred embodiment. As shown in FIG. 13, a compound pixel data (a video data) is rotated 90 degrees counterclockwise and then stored by the above-mentioned inter-register transfer, as in the third preferred embodiment. As apparent from the result, in the fifth preferred embodiment, the compound pixel data rotated 90 degrees counterclockwise is returned and stored in the same register group RG9.

As stated above, the fifth preferred embodiment is characterized in that, in the register group RG8, the storage regions having the same number of bits (one byte) as a compound data serving as a unit, that is, each byte of the respective registers R1 to R4, are directly connected one another in the mentioned connection relationship. Thereby, according to input of a counterclockwise rotation instruction, an image data can be rotated 90 degrees counterclockwise by inter-byte transfer in the register R1 and R2, or R3 and R4. As compared to the case that such processing is conducted in the CPU 24 by software, there is no need to covert the data length of each component data as a unit, thereby the step of converting the data length and a data transfer therefor are not required. This enables to conduct the processing at a high speed and a low power consumption.

Sixth Preferred Embodiment

A sixth preferred embodiment has the same configuration as the first preferred embodiment shown in FIG. 1, except for a coprocessor 25. In the coprocessor 25, an image data provided from a CPU 24 is rotated 90 degrees clockwise in exactly the same manner as in the second preferred embodiment, according to input of a predetermined clockwise rotation instruction. The construction and processing of the coprocessor 25 will be described as below.

FIG. 14 is a diagram illustrating schematically registers of a coprocessor 25 and a connection therebetween, in the sixth preferred embodiment. The coprocessor of the sixth preferred embodiment has 32-bit registers R1 and R2 similar to the registers in the first to fifth preferred embodiments.

In the sixth preferred embodiment, a compound pixel data (a video data) in which two pixels are expressed in 32 bits (for example, in arrangement of color components of "YCrYCb" or "YYCrCb," each component is expressed in eight bits) is stored in registers R1 and R2. A compound pixel data handled herein is the same as that in the first preferred embodiment. In the respective registers R1 and R2, each component data is stored in storage regions (the zero-th to third bytes) which have the same number of bits as a one-component image data serving as a unit corresponding to a unit image signal of the invention (in the above example, Y, Cb or Cr component).

The respective bytes of the registers R1 and R2 are directly and electrically connected with each other by a predetermined connecting line in the following manner.

Specifically, the zero-th byte B0 of the register R1 is connected to the zero-th byte B0 of the register R2; the first byte B1 of the register R1 is connected to the second byte B2 of the register R2; the second byte B2 of the register R1 is connected to the first byte B1 of the register R2; and the third byte B3 of the register R1 is connected to the third byte B3 of the register R2.

With this construction, the coprocessor 25 enables to convert a compound pixel data of a first arrangement of color components in which two pixels are expressed in 32 bits, to a compound pixel data of a second arrangement of color components in which two pixels are expressed in 32 bits. For instance, it is easily understandable from FIG. 14 that a compound pixel data (a video data) in a format of expressing "YYCrCb" as the first unit of arrangement of color components, can be converted to a compound pixel data (a video data) in a format of expressing "YCrYCb" as the second unit of arrangement of color components.

In FIG. 14, the respective bytes of the registers R1 and R2 are connected in one-to-one correspondence, and therefore, the above-mentioned conversion of arrangement of color components is reversible. In the above example of video data, when the compound pixel data in the format of "YCrYCb" as the second unit of arrangement of color components, is inputted to the register R2 and then transferred to the register R1, the compound pixel data in the format of "YYCrCb" as the first unit of arrangement of color components, can be fetched from the register R1.

As stated above, the sixth preferred embodiment is characterized in that, in the registers R1 and R2, the storage regions having the same number of bits (one byte) as a compound data serving as a unit, that is, each byte of the respective registers R1 and R2, are directly connected with each other in the mentioned connection relationship. Thereby, the format of arrangement of color components of video data can be conducted by inter-byte transfer in the register R1 and R2. As compared to the case that such processing is conducted in the CPU 24 by software, there is no need to covert the data length of each component data as a unit, thereby the step of converting the data length and a data transfer therefor are not required. This enables to conduct the processing at a high speed and a low power consumption.

Modifications

While the first to sixth preferred embodiments illustrate coprocessors in digital still cameras and examples of image processing performed by the coprocessors, it should be understood that the present invention is not limited thereto.

The first to sixth preferred embodiments are directed to a digital still camera as an image input apparatus, however, in other image input apparatuses such as digital video cameras, a coprocessor similar to that in these embodiments can be employed as a signal processing circuit.

Although in the first to sixth preferred embodiments, a storage means of the invention is a register or register group, the invention is applicable to other storage media such as memory, e.g., SRAM and DRAM.

In the first to sixth preferred embodiments, an 8-bit is used as the data length of an image data as a unit, and each register of the coprocessor 25 is a 32-bit register. However, multiple lengths of the data length of an image data as a unit, may be employed as a processing unit of the register. For example, a 16-bit is employed as the data length of an image data as a unit, and the coprocessor 25 performs processing with a 16-bit register.

While in the sixth preferred embodiment, conversion of arrangement of color components is achieved by transferring a compound pixel data between the registers R1 and R2, a compound pixel data after conversion may be stored in the same register, as in the fourth and fifth preferred embodiments. Specifically, in the register R1, the following connections are made between the zero-th byte B0 and the zero-th byte B0; between the first byte B1 and the second byte B2; between the second byte B2 and the first byte B1; and between the third byte B3 and the third byte B3, and also a selector is provided which performs switching between input of an image data from the CPU 24, and transfer within the register R1. This enables to reduce the capacity of the register.

While the invention has been shown and described in detail, the foregoing description is in all aspects illustrative and not restrictive. It is therefore understood that numerous modifications and variations can be devised without departing from the scope of the invention.

What is claimed is:

1. A signal processing circuit of an image input apparatus, comprising:

first and second register groups provided with a plurality of storage regions of the same number of bits as a unit image signal in predetermined units that is obtained by an image pickup device in said image input apparatus and arranged in two dimensions, said first and second register groups having first to fourth registers, respectively, said first to fourth registers having zero-th to third storage regions, respectively, wherein said zero-th storage regions of said first to fourth registers of said first register group are connected directly, by a predetermined connecting line, to said zero-th to third storage regions of said fourth register of said second register group, said first storage regions of said first to fourth registers of said first register group are connected directly, by a predetermined connecting line, to said zero-th to third storage regions of said third register of said second register group, said second storage regions of said first to fourth registers of said first register group are connected directly, by a predetermined connecting line, to said zero-th to third storage regions of said second register of said second register group, and said third storage regions of said first to fourth registers of said first register group are connected directly, by a predetermined connecting line, to said zero-th to third storage regions of said first register of said second register group.

2. A signal processing circuit of an image input apparatus, comprising:

first and second register groups provided with a plurality of storage regions of the same number of bits as a unit image signal in predetermined units that is obtained by an image pickup device in said image input apparatus and arranged in two dimensions, said first and second register groups having first to fourth registers, respectively, said first to fourth registers having zero-th to third storage regions, respectively, wherein said zero-th storage regions of said first to fourth registers of said first register group are connected directly, by a predetermined connecting line, to said zero-th to third storage regions of said fourth register of said second register group, said first storage regions of said first to fourth registers of said first register group are connected directly, by a predetermined connecting line, to said zero-th to third storage regions of said third register of said second register group, said second storage regions of said first to fourth registers of said first register group are connected directly, by a predetermined connecting line, to said zero-th to third storage regions of said second register of said second register group, and said third storage regions of said first to fourth registers of said first register group are connected directly, by a predetermined connecting line, to said zero-th to third storage regions of said first register of said second register group; and a third register group having first to fourth registers which are respectively provided with zero-th to third storage regions of the same number of bits as a unit image signal in predetermined units arranged in two dimensions, wherein said zero-th to third storage regions of said first register of said second register group are connected directly, by a predetermined connecting line, to said third to zero-th storage regions of said first register of said third register group, respectively, said zero-th to third storage regions of said second register of said second register group are connected directly, by a predetermined connecting line, to said third to zero-th storage regions of said second register of said third register group, respectively, said zero-th to third storage regions of said third register of said second register group are connected directly, by a predetermined connecting line, to said third to zero-th storage regions of said third register of said third register group, respectively, and said zero-th to third storage regions of said fourth register of said second register group are connected directly, by a predetermined connecting line, to said third to zero-th storage regions of said fourth register of said third register group, respectively.

3. A signal processing circuit of an image input apparatus, comprising:

second and third register groups provided with a plurality of storage regions of the same number of bits as a unit image signal in predetermined units that is obtained by an image pickup device in said image input apparatus and arranged in two dimensions, said second and third register groups having first to fourth registers, said first to fourth registers having zero-th to third storage regions, wherein said zero-th to third storage regions of said first register of said second register group are connected directly, by a predetermined connecting line, to said third to zero-th storage regions of said first register of said third register group, respectively;

said zero-th to third storage regions of said second register of said second register group are connected directly, by a predetermined connecting line, to said third to zero-th storage regions of said second register of said third register group, respectively;

said zero-th to third storage regions of said third register of said second register group are connected directly, by a predetermined connecting line, to said third to zero-th storage regions of said third register of said third register group, respectively; and said zero-th to third storage regions of said fourth register of said second register group are connected directly, by a predetermined connecting line, to said third to zero-th storage regions of said fourth register of said third register group, respectively.

* * * * *